US005246519A

United States Patent [19]

McCormick

[11] Patent Number: 5,246,519

[45] Date of Patent: Sep. 21, 1993

[54] METHOD FOR APPLICATION OF A SELF-ADHESIVE STICKER

[75] Inventor: Ronald G. McCormick, Poplar Grove, Ill.

[73] Assignee: Chrysler Corporation, Highland Park, Mich.

[21] Appl. No.: 878,241

[22] Filed: May 4, 1992

[51] Int. Cl.[5] ............ B32B 31/00

[52] U.S. Cl. ............ 156/247; 156/391; 156/289; 156/108; 40/593; 33/613

[58] Field of Search ............ 40/593, 591; 33/562, 33/563, 613, 616, 622; 156/71, 99, 108, 289, 247, 391

[56] References Cited

U.S. PATENT DOCUMENTS

| | | | |
|---|---|---|---|
| 3,287,814 | 11/1966 | Littman | 33/613 |
| 4,369,582 | 1/1983 | Pfeffer | 156/DIG. 2 X |
| 4,469,550 | 9/1984 | O'Steen | 156/247 X |
| 4,580,815 | 4/1986 | Barber | 156/64 X |
| 4,668,324 | 5/1987 | Burns | 156/247 X |
| 4,834,824 | 5/1989 | Tiedeck | 156/247 X |
| 5,085,721 | 2/1992 | Tanuma | 156/247 X |

*Primary Examiner*—David A. Simmons
*Assistant Examiner*—Charles Rainwater
*Attorney, Agent, or Firm*—Edward A. Craig

[57] ABSTRACT

A method of applying a self-adhesive sticker to a vehicle, which vehicle has a predetermined shaped window opening and a window therein. The method of the present invention includes the steps of first providing a self-adhesive sticker applicator. The applicator has a template portion having an outside shape which closely follows the predetermined shape of the window opening and provides for fitted positioning in the window opening. The template portion has a central opening large enough to allow a sticker to pass therethrough. An applicator portion is attached to the template portion and includes a pressure applying portion which overlies the central opening. The applicator portion includes a sticker attachment portion wherein a sticker or decal or the like may be attached to this portion with an adhesive side facing the central opening. The pressure applying portion is adapted for having at least portions thereof which are pressable through the central opening for pressing the sticker into engagement with the window of the vehicle. A self-adhesive window sticker with an exposed adhesive surface is then provided and affixed to the sticker attachment portion with the adhesive surface facing the central opening. The template is positioned in the window opening such that the adhesive surface is facing the vehicle window and the pressure applying portion is caused to force the adhesive surface of the sticker into the window. Thereafter, the applicator is removed from the sticker and the sticker is finally adhered to the window by hand after being positioned in the window as set forth above.

8 Claims, 2 Drawing Sheets

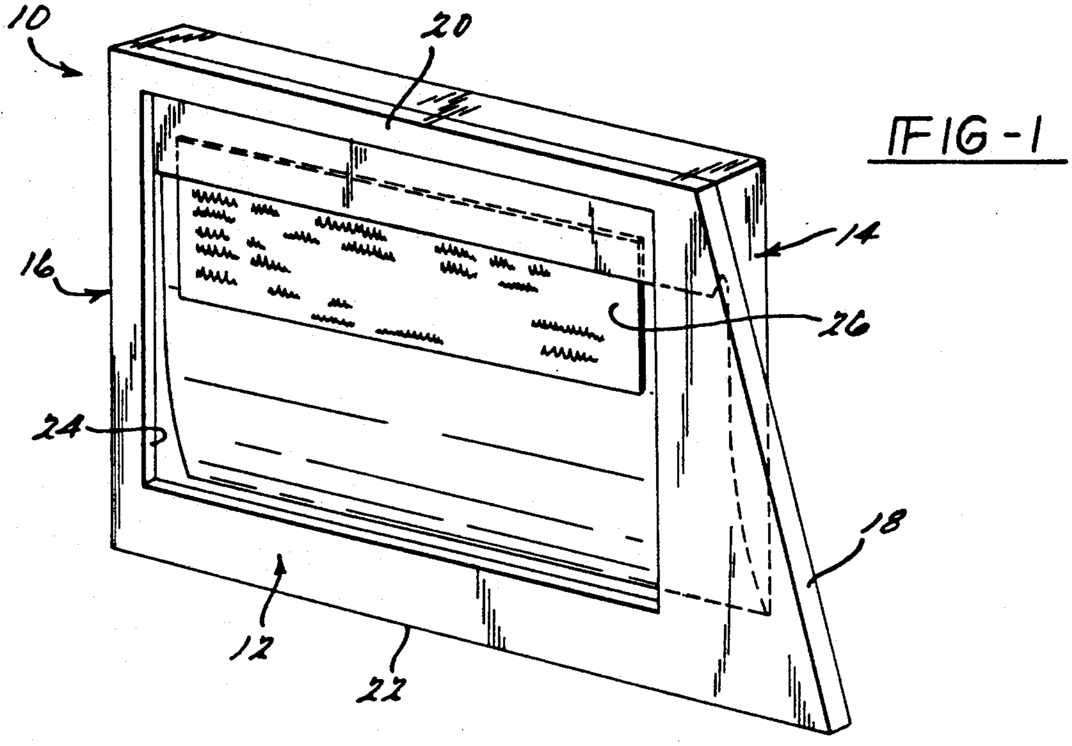
FIG-1
FIG-2
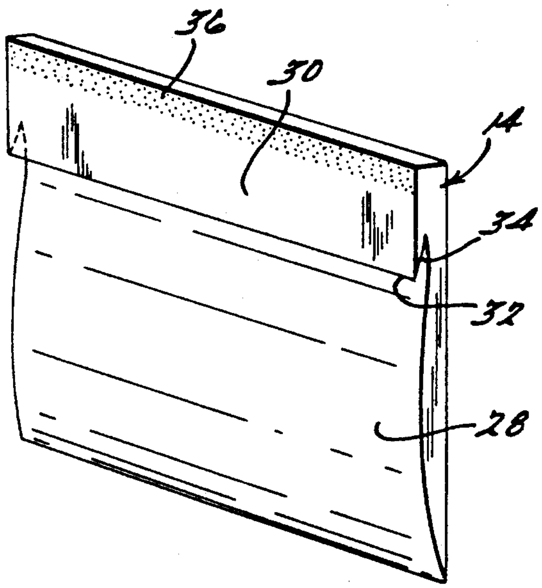
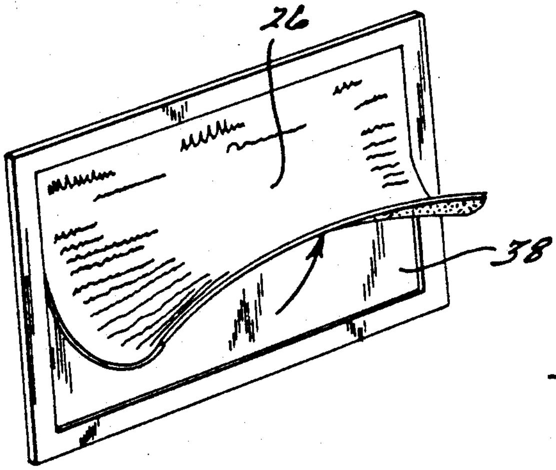
FIG-3

METHOD FOR APPLICATION OF A SELF-ADHESIVE STICKER

BACKGROUND OF THE INVENTION

1. Technical Field

The present invention relates to a method for applying stickers to vehicles in an organized consistent manner. More particularly, the present invention relates to a manual method for applying stickers to windows of vehicles.

2. Related Art

Several hand applicators have been utilized for advantageously applying stickers or the like in a consistent manner on various surfaces. Thus, applicators have been provided for holding a plurality of stickers in a single machine, which stickers can be applied quickly to apply stickers wherever desirable. Such an applicator is shown in U.S. Pat. No. 4,610,752 to Arnold. Other prior devices include various hand applicators for precisely applying various stickers or other sheet-like materials to a substrate surface. Such devices are shown in U.S. Pat. Nos. 3,350,253 to Goodhart; 3,967,021 to Weingrad; 4,469,550 to O'Steen; and 5,022,951 to Behlmer et al. Other devices include tools for applying large sheets of material such as wallpapers and the like, which include such devices as shown in U.S. Pat. Nos. 609,008to Carter; 4,490,198 to Mitchell; and 3,907,628 to Buske. In addition, other applicators have been used for positioning or affixing articles such as electrical boxes to a wall such as shown in U.S. Pat. No. 4,404,751 to Rieckenberg.

While these patents provide various methods for applying stickers and the like and have saved many people time and effort in accurately applying such stickers there remains a need in the art for providing a method for positioning and applying a sticker to a vehicle window in a predetermined position. In such a device the repeatability would be essential since quality and consumer appearance are very important in the vehicle industry today. While the device shown in U.S. Pat. No. 2,783,910 to Johnson provides a means for utilizing a labeling mechanism over and over such an invention is not readily applicable to applying a sticker to a vehicle in a predetermined position. Thus, there remains a need in the art from a manufacturing standpoint to provide a sticker applicator which can put vehicle price stickers, rust proofing stickers or other advertising and the like in a precise location on a vehicle window with little or no effort or human error involved.

SUMMARY OF THE INVENTION

In accordance with the present invention there is provided a method of applying a self-adhesive sticker to a vehicle which vehicle has a predetermined shaped window opening and a window therein. The method of the present invention includes the steps of first providing a self-adhesive sticker applicator. The applicator has a template portion having an outside shape which closely follows the predetermined shape of the window opening and provides for fitted positioning in the window opening. The template portion has a central opening large enough to allow a sticker to pass therethrough. An applicator portion is attached to the template portion and includes a pressure applying portion which overlies the central opening. The applicator portion includes a sticker attachment portion wherein a sticker or decal or the like may be attached to this portion with an adhesive side facing the central opening. The pressure applying portion is adapted for having at least portions thereof which are pressable through the central opening for pressing the sticker into engagement with the window of the vehicle. A self-adhesive window sticker with an exposed adhesive surface is then provided and affixed to the sticker attachment portion with the adhesive surface facing the central opening. The template portion is positioned in the window opening such that the adhesive surface is facing the vehicle window and the pressure applying portion is caused to force the adhesive surface of the sticker into the window. Thereafter, the applicator is removed from the sticker and the sticker is finally adhered to the window by hand after being positioned in the window as set forth above. It is therefore an object of the present invention to provide a sticker application method which may be utilized during a manufacturing process to quickly locate a sticker in a certain position on a window and allow application of the sticker in a quick and efficient manner.

Other objects and advantages of the present invention will be readily appreciated as same becomes better understood by reference of the following description when considered in connection with the accompanying drawings and the claims appended hereto.

BRIEF DESCRIPTION OF THE DRAWINGS

FIG. 1 is a perspective view of a sticker applicator used in accordance with the teachings of the present invention;

FIG. 2 is a perspective view of the applicator portion of the sticker applicator of FIG. 1;

FIG. 3 is a perspective view showing a sticker being removed from a backing member;

DESCRIPTION OF THE PREFERRED EMBODIMENTS

Figure 4:
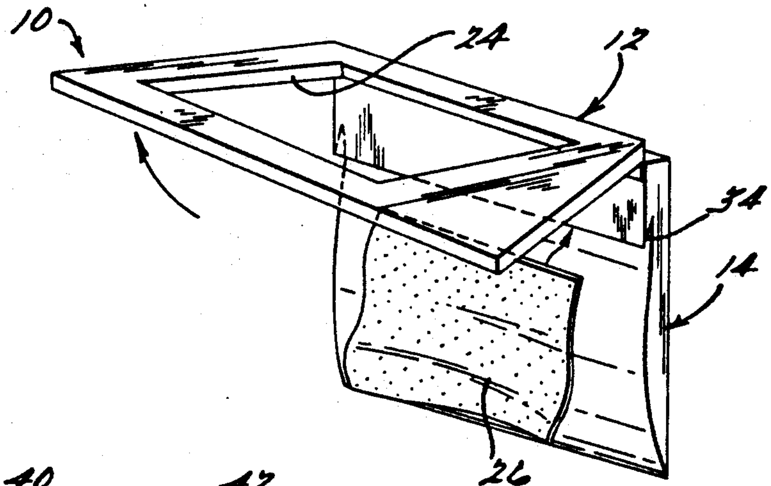
FIG. 4 is a perspective view demonstrating the positioning of the sticker in the sticker applicator and the hinging of the upper sticker applicator.

In the broadest aspects of the present invention a method is provided wherein a sticker or other self-adhering material can be placed in a predetermined location on a window such as in a vehicle having a predetermined framed in shape.

Referring now to the drawings, the first step of the method of the present invention is to provide a self-adhesive sticker applicator such as that shown generally at 10. The self-adhesive sticker applicator includes a first template portion 12 and an applicator portion 14. The template portion 12 is generally planar and has an outside shape or perimeter which closely follows a predetermined shape of the window opening into which it is to be positioned. The shape shown includes a trapezoidal shaped periphery with a box shaped end 16 and an angular end 18 for matching a predetermined shape such as a trapezoidal shape of a rear vehicle window in an automobile. The template portion includes an upper edge 20 and a lower edge 22. The template portion 12 also includes surfaces defining the central opening 24 in the template portion 12. The central opening 24 is shown centrally located in the template and is large enough to allow a sticker 26 to pass through it at the appropriate time. While the central opening 24 is centrally located on the template portion 12 it will be readily appreciated by those skilled in the art that depending on the desirable positioning of the sticker in the final window surface the opening could be varied along the surface of the template portion 12 to consistently position a sticker or decal in the same position on a vehicle window.

The self-adhesive sticker applicator of the present invention is designed to be utilized by a human operation for manual application of stickers to a window. Thus, the template portion is designed to be hand held and manipulated for an assembly line worker.

Referring now particularly to FIG. 2, a detailed view of the applicator portion 14 is shown therein. The applicator portion 14 includes a pressure applying portion 28 and a sticker attachment portion 30. The sticker attachment portion 30 includes an overlying lip 32. The overlying lip portion 32 overlies the pressure applying portion 28 and defines a surface 34 which extends from pressure applying portion 28 but faces the pressure applying portion 28 and allows the adhesive side of a sticker 26 to be attached to the surface 34 as is generally shown in FIG. 1. The applicator portion 14 includes at its upper edge 20 an epoxy strip or the like 36 which provides attachment to the upper edge 20 of the template portion 12. The applicator portion 14 may be attached hingedly to upper edge 20 such as shown herein or it could be solidly attached as would be appreciated by those skilled in the art provided the applicator portion 14 is made out of a flexible material which allows some hinging between the template portion 12 and the applicator portion 14 to allow attachment of the sticker 26.

The applicator portion 14 must be designed in such a manner that it is flexible and such that at least a portion of the pressure applying portion 28 may be pressed through the central opening 24 of the template portion 12 to provide contact of the adhesive surface of the sticker 26 with a window portion. Thus, in a preferred embodiment the applicator portion 14 is constructed of a resilient flexible material such as milled plexiglass or semi-hard rubber. In contrast, the template portion 12 is utilized over and over again to position the sticker properly in a window opening and is made from more structurally rigid material such as plexiglass, structural plastic or metal.

Figure 5:
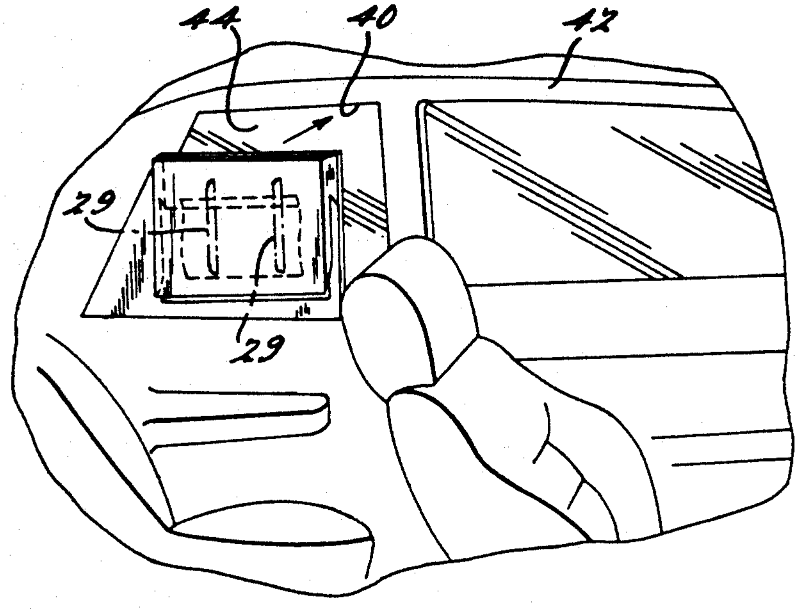
FIG. 5 is a perspective view depicting the positioning of the template portion of the applicator and the predetermined shape of the window opening in which the sticker is to be applied.
Figure 8:
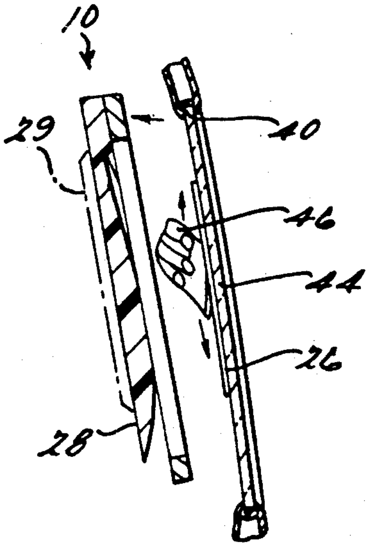
FIG. 8 is a sectional view showing the final application of the sticker to the vehicle window.

If desirable, for a particular use such as wherein a very large sticker or decal is applied, the application portion may include reinforcement ribs 29 shown in phantom in FIGS. 5 and 8. Reinforcement ribs 29 could be vertically disposed on the back of the applicator portion 28 to provide a flatter overall application surface. Of course, other reinforcements could be utilized without deviating from the teachings of the present invention.

Referring to the detailed process of the present invention, a self-adhesive window sticker or decal 26 is provided by peeling it off of a suitable substrate 38. Self-adhesive window stickers such as: a price sticker, a rust proofing sticker, other advertising stickers or the like, may be utilized. Such a sticker is removed from their respective backing to expose the adhesive portion of the sticker. It will be readily appreciated that the present invention can be practiced with other types of stickers such as decals or the like provided the sticker can be temporarily attached at the surface 34 prior to proceeding with the remaining steps of the present invention.

Referring to FIG. 4, after the sticker 26 is removed from the backing substrate 38 the template portion 12 is hingedly separated from the applicator portion 14 along the hinge area at the upper edge 20 and the sticker 26 is applied to the surface 34 such that the adhesive faces toward the central opening 24 formed by surfaces in the template portion 12.

Referring now to FIG. 5, the assembly of FIG. 4, including the self-adhesive sticker applicator 10 and the sticker 26 attached thereto are positioned in the predetermined shaped window frame 40 of the vehicle 42 such that the assembly is flushed with the window 44 with the template portion 12 nested into the opening 40.

Figure 6:
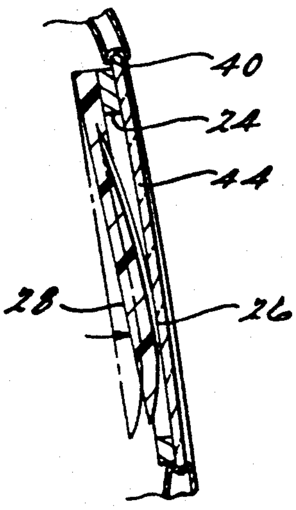
FIG. 6 is a sectional view showing the applicator portion pressing the adhesive portion of the sticker into the window surface for application of the sticker.
Figure 7:
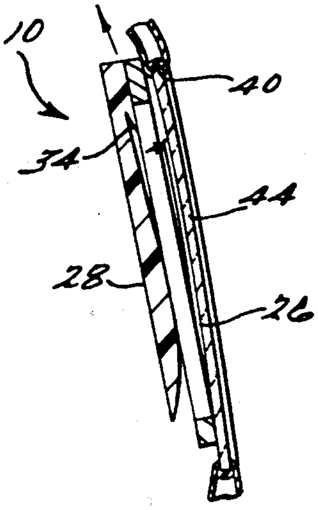
FIG. 7 is a sectional view showing the removal of the sticker applicator.

Referring now to FIGS. 6, 7 and 8, the remaining steps of the present invention are illustrated. Referring to FIG. 6, the pressure applying portion 28 is moved from its normal position shown in phantom through the central opening 24 to cause the adhesive side of the sticker 26 at the lower portion of the sticker to come in contact with window 44. Thereafter, the pressure applying portion 28 is allowed to return to its normal position and the entire assembly 10 is removed from the window frame 40 and window 44 which causes releasing of the sticker 26 from the surface 34. The self-adhesive sticker applicator 10 is removed from the window as shown in FIG. 8. This leaves the sticker attached to the window at the proper location at the lower portion of the sticker. The sticker is then in proper position to allow final attachment. For final attachment the sticker is smoothed out by an operator 46 to provide the proper application of the sticker in a centralized location on the window 44.

As stated above, while centering of the opening 24 in the template may be desirable, by configuring the opening, or decal size, in different locations other positioning of stickers could be consistently accomplished, as will be readily appreciated by those skilled in the art.

The method of the present invention provides consistent repeatability in application of stickers to vehicle windows. Thus, the subject method will save both time and materials over prior methods.

While the above description constitutes the preferred embodiments of the present invention, it is to be appreciated that the invention is susceptible to modification, variation and change without departing from the proper scope and fair meaning of the accompanying claims.

What is claimed is:

1. A method of applying a self-adhesive sticker to a vehicle, said vehicle having a predetermined shaped window opening and a window, comprising the steps of:

a) providing a self-adhesive sticker applicator comprising: a template portion having an outside shape for closely following said predetermined shaped window opening for fitted positioning in said predetermined shaped window opening, said template portion having a central opening large enough to allow a self-adhesive sticker to pass therethrough; and an applicator portion attached to said template portion, said applicator portion including a pressure applying portion overlying said central opening and a sticker attachment portion, wherein a self-adhesive sticker may be attached to said sticker attachment portion with an adhesive side facing said central opening, said pressure applying portion adapted for having at least portions thereof being moveable through said central opening for pressing a self-adhesive sticker into engagement with said window of said vehicle;

b) providing a self-adhesive window sticker with an adhesive surface exposed thereon to be applied to said window;

c) affixing said self-adhesive sticker to said sticker attachment portion with said adhesive surface facing said central opening;

d) positioning said template portion in said window opening such that said adhesive surface is facing said vehicle window;

e) causing said pressure applying portion to force said adhesive surface of said self-adhesive sticker into said window;

f) releasing said self-adhesive sticker from said sticker attachment portion and removing said applicator from said window; and g) finally adhering said self-adhesive sticker to the window.

2. The method of claim 1 wherein said sticker attachment portion includes an overhanging lip portion having a surface facing said applicator portion whereby a portion of said adhesive surface of said self-adhesive sticker is attached to said surface of said overhanging lip portion.

3. The method of claim 1 wherein said template portion is hingedly attached to said applicator portion.

4. The method of claim 1 wherein said applicator portion is made of a resilient material.

5. The method of claim 4 wherein said material is selected from the group consisting of semi-hard rubber and milled plexiglass.

6. The method of claim 1 wherein said template portion is made of a structurally rigid material.

7. The method of claim 6 wherein said structurally rigid material is selected from the group consisting of plexiglass, structural plastics and metal.

8. A method of manually applying a self-adhesive window sticker to a vehicle, said vehicle having a predetermined shaped window opening and a window, comprising the steps of:

a) providing a self-adhesive sticker applicator comprising: a template portion made of a relatively stiff material having an outside shape for closely following said predetermined shaped window opening for fitted positioning in said predetermined shaped window opening, said template portion having a central opening large enough to allow a self-adhesive window sticker to pass therethrough; and an applicator portion hingedly attached to said template portion, said applicator portion including a pressure applying portion overlying said central opening and a lip portion overlying said pressure applying portion and having a surface facing said applicator portion and a sticker attachment portion, wherein a self-adhesive window sticker may be attached to said surface with an adhesive side facing said central opening, said pressure applying portion adapted for having at least portions thereof being manually moveable through said central opening for manually pressing a self-adhesive window sticker into engagement with said window of said vehicle;

b) providing a self-adhesive window sticker with an adhesive surface exposed thereon to be applied to said window;

c) affixing said self-adhesive window sticker to said sticker attachment portion with said adhesive surface facing said central opening;

d) positioning said template portion in said window opening such that said adhesive surface is facing said vehicle window;

e) causing said pressure applying portion to force said adhesive surface of said self-adhesive window sticker into said window;

f) releasing said self-adhesive window sticker from said sticker attachment portion and removing said applicator from said window; and g) finally adhering said self-adhesive window sticker to the window.

* * * * *